United States Patent
Uzun (10) Patent No.: US 7,142,504 B1
(45) Date of Patent: Nov. 28, 2006

(54) FAULT TOLERANT NETWORK TRAFFIC MANAGEMENT

(75) Inventor: Necdet Uzun, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 741 days.

(21) Appl. No.: 09/843,021

(22) Filed: Apr. 25, 2001

(51) Int. Cl.
*G01R 31/08* (2006.01)

(52) U.S. Cl. ............... 370/224; 370/249; 370/404

(58) Field of Classification Search ........ 370/216–228, 370/241–253, 258, 395.1, 400, 401, 402, 370/404–406, 389; 714/716
See application file for complete search history.

(56) References Cited

U.S. PATENT DOCUMENTS

| | | | | |
|---|---|---|---|---|
| 4,519,070 A | * | 5/1985 | Bell ........................... | 370/222 |
| 5,442,620 A | * | 8/1995 | Kremer ....................... | 370/224 |
| 5,469,428 A | * | 11/1995 | Tokura et al. ............... | 370/224 |
| 5,815,489 A | * | 9/1998 | Takatori et al. ............. | 370/217 |
| 6,594,232 B1 | * | 7/2003 | Dupont ........................ | 370/224 |
| 6,614,760 B1 | * | 9/2003 | Suzuki et al. ................ | 370/244 |
| 6,657,952 B1 | * | 12/2003 | Shiragaki et al. ............. | 370/223 |
| 6,711,125 B1 | * | 3/2004 | Walrand et al. .............. | 370/223 |
| 6,865,149 B1 | * | 3/2005 | Kalman et al. .............. | 370/225 |

OTHER PUBLICATIONS

D. Tsiang and G. Suwala, RFC 2892, The Cisco SRP MAC Layer Protocol, Cisco Systems, Aug. 2000, pp. 1-52.

* cited by examiner

*Primary Examiner*—Doris H. To
*Assistant Examiner*—Ian N. Moore
(74) *Attorney, Agent, or Firm*—Campbell Stephenson Ascolese LLP (57) ABSTRACT

A system and apparatus for transmitting transit data through a network with first and a second rings coupling two or more nodes. In one aspect, when the first ring is intact and the second ring has a fault between two nodes, transit data may be wrapped from a second, faulted ring to a first, intact ring at an upstream node adjacent to a fault, and transit data may be maintained on the first, intact ring between the upstream node and a downstream node adjacent to the fault. In another aspect, when the system has a fault between any two nodes, the system may preserve host data.

14 Claims, 7 Drawing Sheets

FAULT TOLERANT NETWORK TRAFFIC MANAGEMENT

BACKGROUND

The present invention is directed to network communications.

Figure 1A:
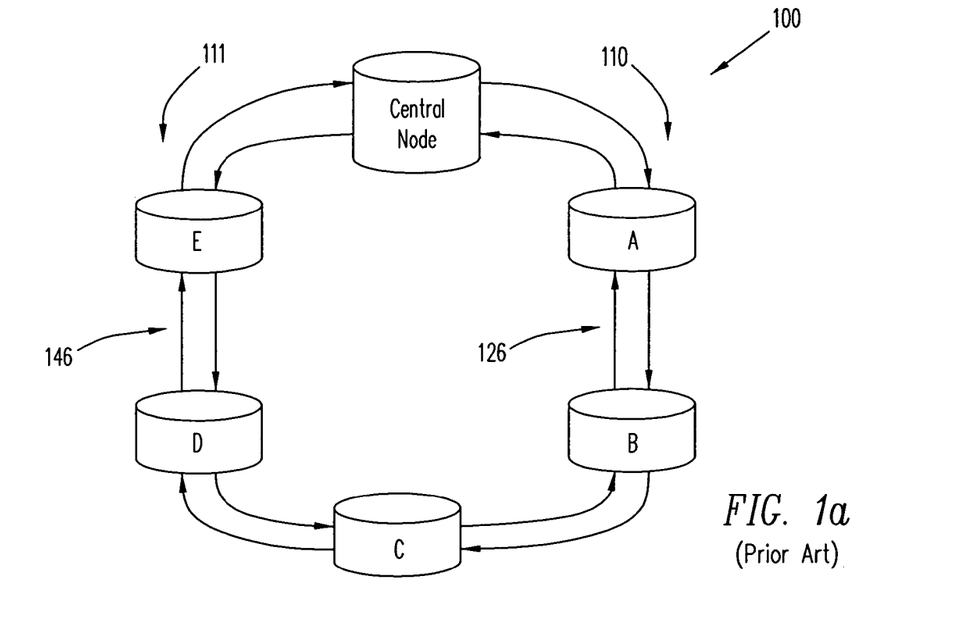
FIG. 1a is a diagram of a prior art six-node bi-directional ring topology network.

A communications network such as network 100 of FIG. 1a may include a plurality of stations or nodes (Central Node and nodes A–E) coupled by transmission media (e.g., cable wire or optical fiber) providing a path for the transmission of data (e.g., E-mail, video, multimedia, or voice) between two or more nodes. The data may be transferred in accordance with a network protocol (e.g., Internet Protocol (IP), asynchronous transfer mode (ATM), or synchronous optical network/synchronous digital hierarchy (SONET/SDH)) over optical transmission media. The network 100 may include one or more central nodes and one or more branch nodes (A–E) connected by an inner ring 126 and an outer ring 146. The network configuration may be based on a dual ring topology, where data is transmitted from a source node to a destination node (often through intermediary nodes) by transmitting data along one of two rings, where the rings have traffic flowing in opposing directions (clockwise direction 110 or counterclockwise direction 111). Control information may be routed in a direction opposite the control information's respective data. As data enters each successive node, local data is split off and transit data passes through the node along the ring.

Figure 1B:
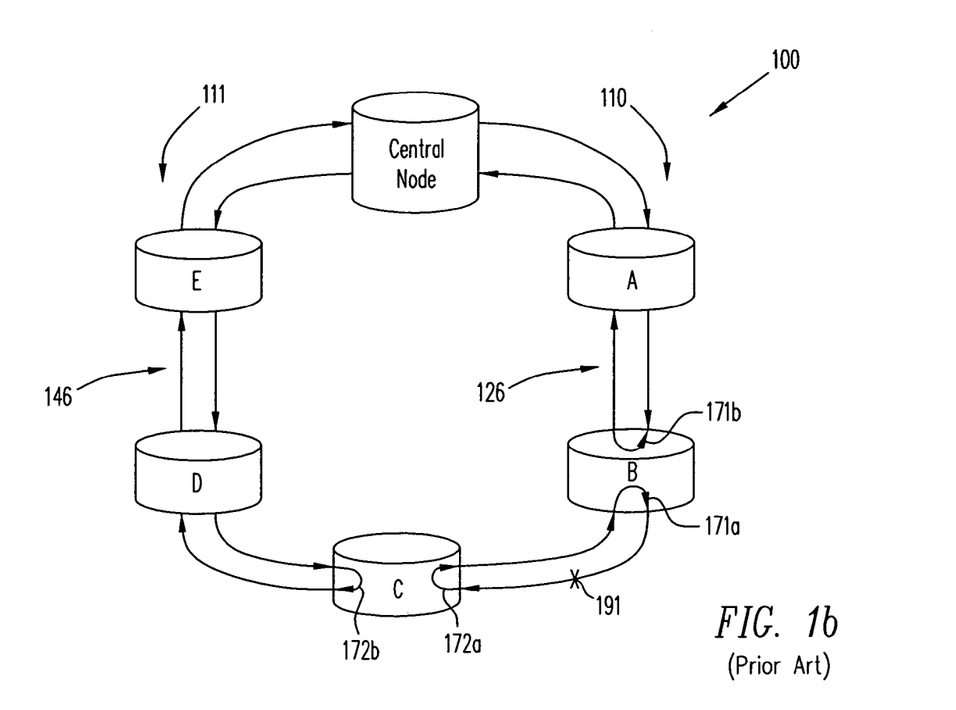
FIG. 1b is a diagram of the network of FIG. 1a with a fault between two nodes.

In a conventional network using a dual-ring topology, when there is a fault in one of the rings (for example, fault 191 in FIG. 1b) between two nodes (B and C), the data on both inner ring 126 and outer ring 146 is wrapped (i.e., the packets are redirected to the unbroken ring) in the two adjacent nodes (B and C, via paths 171b and 172b) to bypass the fiber paths between the two nodes (one path of which does not have a fault). Typically, the data is also wrapped between the nodes (B and C, via paths 171a and 172a) in a way that some host data entering the ring at a node adjacent to the break is dropped.

SUMMARY

In one aspect, the invention provides a system that includes first and a second rings coupling two or more nodes and a method for transmitting transit data through the system wherein the first ring is intact and the second ring has a fault between two nodes. The method includes the steps of wrapping transit data from a second, faulted ring to a first, intact ring at an upstream node adjacent to a fault, and maintaining transit data on the first, intact ring between the upstream node and a downstream node adjacent to the fault. In one aspect, the method may include the steps of receiving host data for the first, intact ring at the downstream node, and maintaining the host data on the first, intact ring. In another aspect, the method may include the steps of receiving host data for the first, intact ring at the downstream node, and wrapping the host data onto the second, faulted ring.

In another aspect, the invention provides a network including one or more nodes connected by first and second rings formed by two or more transmission media, each transmission media including one or more signal channels. The network includes a first node, a second node connected to the first node by a first transmission media adapted to transmit transit data from the first node to the second node and a second transmission media adapted to transmit transit data from the second node to the first node, a third node connected to the second node by a third transmission media adapted to transmit transit data from the second node to the third node and a fourth transmission media adapted to transmit transit data from the third node to the second node, and a fourth node connected to the first node by a fifth transmission media adapted to transmit transit data from the fourth node to the first node and a sixth transmission media adapted to transmit transit data from the first node to the fourth node. The second node is operable to receive transit data from the fourth transmission media, detect a first fault in the second transmission media, and forward the transit data from the third node received on the fourth transmission media to the third node on the third transmission media. The first node is operable to receive transit data on the fifth transmission media; and, irrespective of the existence of the first fault, forward the transit data from the fourth node to the second node on the fifth and first transmission media.

In another aspect of the invention, the first node may be operable to receive host data; upon not detecting the first fault, multiplex the host data with the transit data received on the fifth transmission media and forward the multiplexed data to the second node on the first transmission media; and upon detecting the first fault, forward the host data to the fourth node on the sixth transmission media. In another aspect, the first node may be operable to receive host data and, irrespective of the existence of the first fault, multiplex the host data with the transit data received on the fifth transmission media and forward the multiplexed data to the second node on the first transmission media. In another aspect, the second node may be operable to multiplex first host data received into the second node on a first ring with the transit data received on the first ring from the third node creating first multiplexed data; forward the first multiplexed data to a second ring; receive second host data onto the second ring; multiplex the second host data with the first multiplexed data creating second multiplexed data; and forward the second multiplexed data to the third node on the third transmission media. In anther aspect, the first through sixth transmission media may be fiber. In another aspect, the first node may be operable to detect a second fault in the first transmission media; and forward the transit data from the fourth node received on the fifth transmission media to the fourth node on the sixth transmission media. In another aspect, the second node may be operable to multiplex first host data received into the second node on a first ring with the transit data received on the first ring from the third node creating first multiplexed data; forward the first multiplexed data to a second ring; receive second host data onto the second ring; multiplex the second host data with the first multiplexed data creating second multiplexed data; and forward the second multiplexed data to the third node on the third transmission media; and the first node may be operable to multiplex third host data received into the first node on the second ring with the transit data received on the second ring from the fourth node creating third multiplexed data; forward the third multiplexed data to the first ring; receive fourth host data onto the first ring; multiplex the fourth host data with the third multiplexed data creating fourth multiplexed data; and forward the fourth multiplexed data to the fourth node on the sixth transmission media. In another aspect, one or more nodes may include an add/drop multiplexer operable to extract or add host data. In another aspect, the first node may detect the first fault by interpreting intelligent protection switching data. In another aspect, the first node may be operable to broadcast the first fault to one or more nodes. In another aspect, the first node may include a counter operable to detect the transit data from the second node. In another aspect, the counter may be operable to adjust whenever the transit data is not received. In another aspect, the first node may be operable to detect an idle frame signal. In another aspect, the ring is a small ring.

In another aspect, the invention provides a system that includes a first and a second ring coupling two or more nodes, a method for transmitting first and second transit and first and second host data through the system wherein the first and second rings have faults between two nodes. The method includes the steps of wrapping in a first node first transit data from the second ring to the first ring; receiving first host data in the first node along the first ring; multiplexing the first transit data with the first host data, creating first multiplexed data; routing the first multiplexed data along the first ring; wrapping in a second node second transit data from the first ring to the second ring; receiving second host data in the second node along the second ring; multiplexing the second transit data with the second host data, creating a second multiplexed data; and routing the second multiplexed data along the second ring. In one aspect, the method may contain the steps of receiving third host data in the first node along the second ring; multiplexing the third host data with the first transit data prior to wrapping the first transit data; wrapping the third host data with the first transit data from the second ring to the first ring; receiving fourth host data in the second node along the first ring; multiplexing the fourth host data with the second transit data prior to wrapping the second transit data; and wrapping the fourth host data with the second transit data from the first ring to the second ring.

In another aspect, the invention provides a system that includes a first and a second ring coupling two or more nodes, where the system includes a first node configured to maintain data on a second ring between a first and a second node upon detecting a fault in the first ring between the first and the second nodes; and a second node configured to wrap the data from the first ring onto the second ring. In another aspect, the first node may be configured to receive external data from outside the ring along the second ring; and maintain the external data on the second ring. In another, the first node may be configured to receive external data from outside the ring along the second ring; and wrap the external data onto the first ring.

In another aspect, the invention provides a network including one or more nodes connected by a first and a second ring formed by two or more transmission media, the network comprising a first node; a second node connected to the first node by a first transmission media adapted to transmit transit data from the first node to the second node and a second transmission media adapted to transmit the transit data from the second node to the first node; a third node connected to the second node by a third transmission media adapted to transmit the transit data from the second node to the third node and a fourth transmission media adapted to transmit the transit data from the third node to the second node; and a fourth node connected to the first node by a fifth transmission media adapted to transmit the transit data from the fourth node to the first node and a sixth transmission media adapted to transmit the transit data from the first node to the fourth node. The first node is operable to detect a fault between the first and second nodes in the second transmission media and forward along a second ring first host data received into the first node along the second ring. In another aspect of the invention, upon detecting the fault, the second node may be operable to wrap onto the second ring second host data received into the second node along a first ring. In another aspect of the invention, upon detecting the fault, the second node may be operable to wrap onto the second ring first transit data received into the second node along a first ring, multiplex the first host data with the first transit data creating a first multiplexed data; and transmit the first multiplexed data along the second ring.

Aspects of the invention can include one or more of the following advantages. The system optimizes throughput and decreases propagation delays while maintaining a fault tolerant, reliable system. The invention realizes this goal by keeping as many open channels of communication as possible between the nodes, while rerouting data around transmission media with faults such that no data or control information is dropped.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 3 is a diagram of node B of FIG. 2a.

Like reference symbols in the various drawings indicate like elements.

DETAILED DESCRIPTION

Figure 2A:
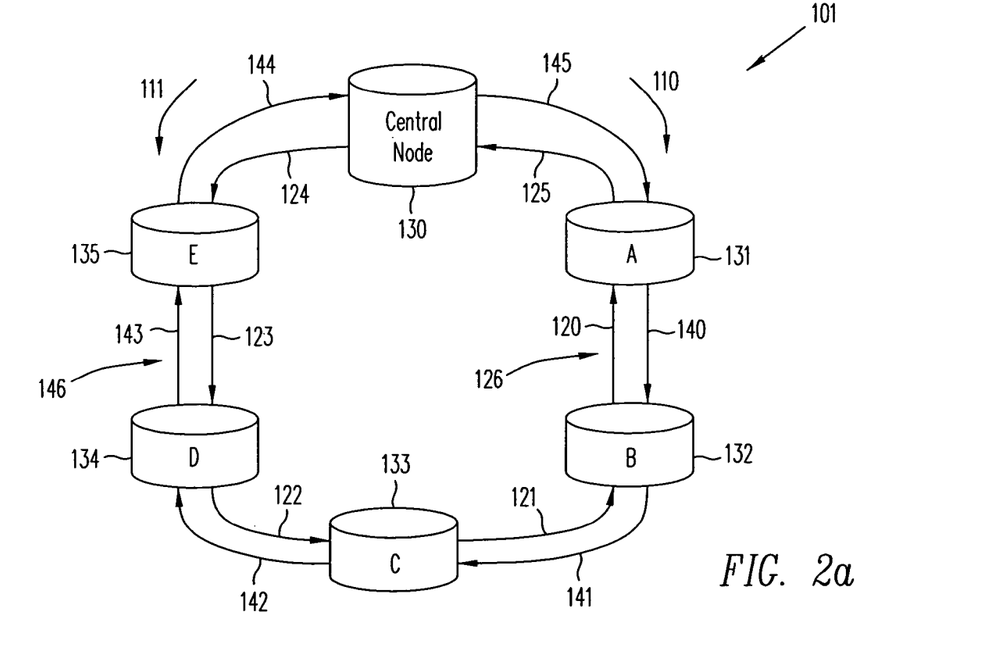
FIG. 2a is a diagram of a six-node bi-directional ring topology network.

Referring to FIG. 2a, network 101 includes a six-node bi-directional dual ring topology. Network 101 may represent without limitation a metropolitan area telecommunications system, a local or wide area network, or a cable television network. Central node 130 is connected to branch nodes 131–135 via transmission media 120–125 (forming an inner ring 126) and 140–145 (forming an outer ring 146). Central node 130 can be configured to forward data to a destination external to the inner and outer rings 126 and 146 such as other networks (for example LANs or WANs). Central node 130 can also receive data from external destinations for forwarding to branch nodes 131–135. Inner and outer rings (126 and 146) may concurrently transport data in opposing directions. Control information associated with the data may be routed in the direction opposite to the direction in which the data associated with the control information is routed. Control information may include IPS (Intelligent Protection Switching) packets, usage packets, and topology discovery packets. IPS packets may include information about the network 101, such as the existence and location of any fiber faults. Usage packets indicate the usage of the network's resources. Topology discovery packets are used to discover the topology of the network 101 and to route packets using the shortest paths.

Figure 3:
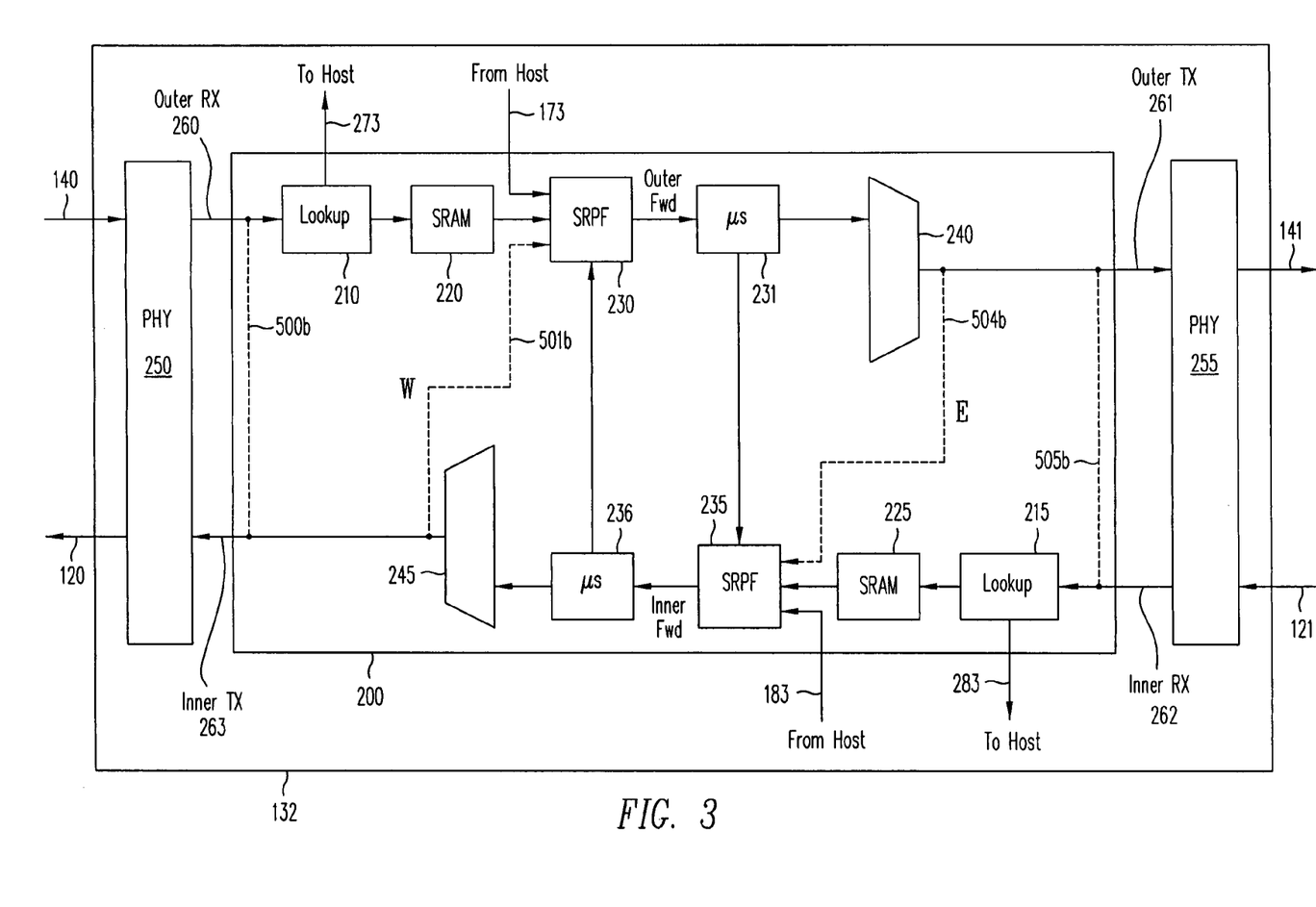

Branch nodes 131–135 may each be associated with a host (such as a network processor) (not shown), and contain a number of line cards (such as line card 200, FIG. 3), and one or more physical layers, such as SONET framers (250 and 255, FIG. 3). Each line card may exist on a single semiconductor chip. Each node contains an intelligent controller (not shown) that routes data on selectable routing paths (500b, 501b, 504b and 505b of FIG. 3), as explained in more detail below. The intelligent controller may be the network processor host or a separate device.

Referring back to FIG. 2a, transmission media 120–125 and 140–145 may be fiber or cable or any other transmission media. Transmission media 120–125 route data from one node to another in counterclockwise direction 111. Transmission media 140–145 route data from one node to another in clockwise direction 110. Data transmitted along inner and outer rings 126 and 146 may include without limitation streaming video, E-mail, multimedia, or voice over IP. This data may be transmitted as packets, with headers indicating source and destination addresses. Nodes 130–135 may be operable to receive data from any other node in the network or directly from a host (input 173 of FIG. 3 receiving information from a host along the outer ring 146, and input 183 of FIG. 3 receiving information from a host along the inner ring 126). When non-adjoining nodes communicate, data passes through intermediary nodes. Once data reaches its destination, the data is stripped from the incoming stream of data. Stripping may be accomplished with a look-up table. Data packets that are not stripped are mulitplexed with any new data arriving from the host and routed along the inner or outer ring (126 or 146).

Figure 2B:
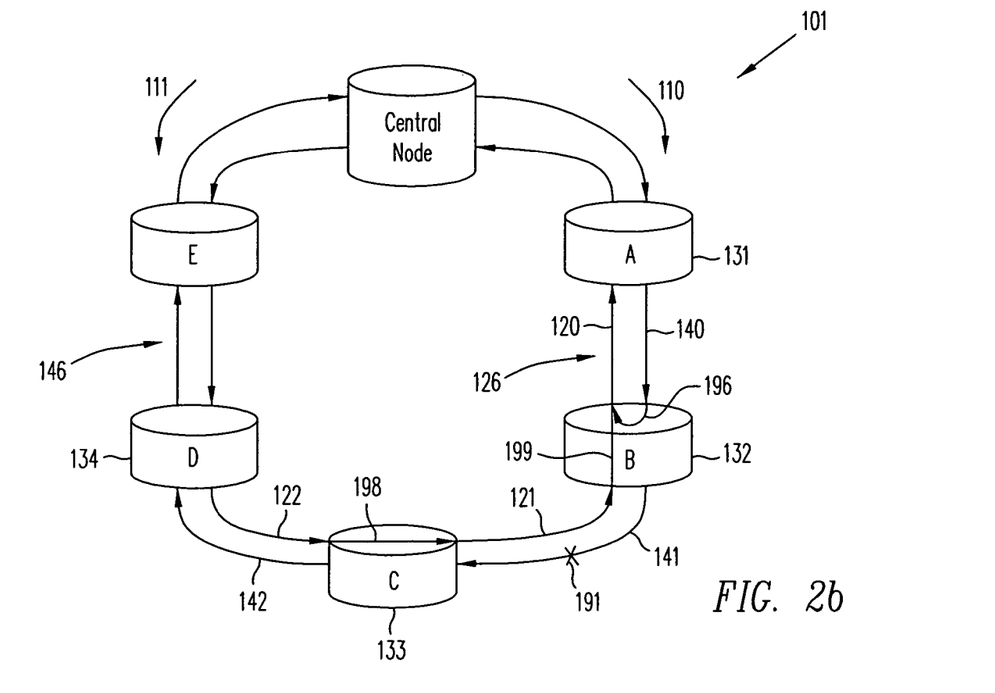
FIG. 2b is a diagram of the network of FIG. 2a with a fault between two nodes.

The architecture of network 101 is designed to be fault tolerant. FIG. 2b illustrates the flow of data for a small ring case in accordance with the invention. Whether a ring is "large" or "small" depends on the propagation delays in the ring, which in turn depends in part on the number of nodes in the ring and the distance between nodes. For example, rings that are less than 200 kilometers in circumference can be assumed small.

Figure 2C:
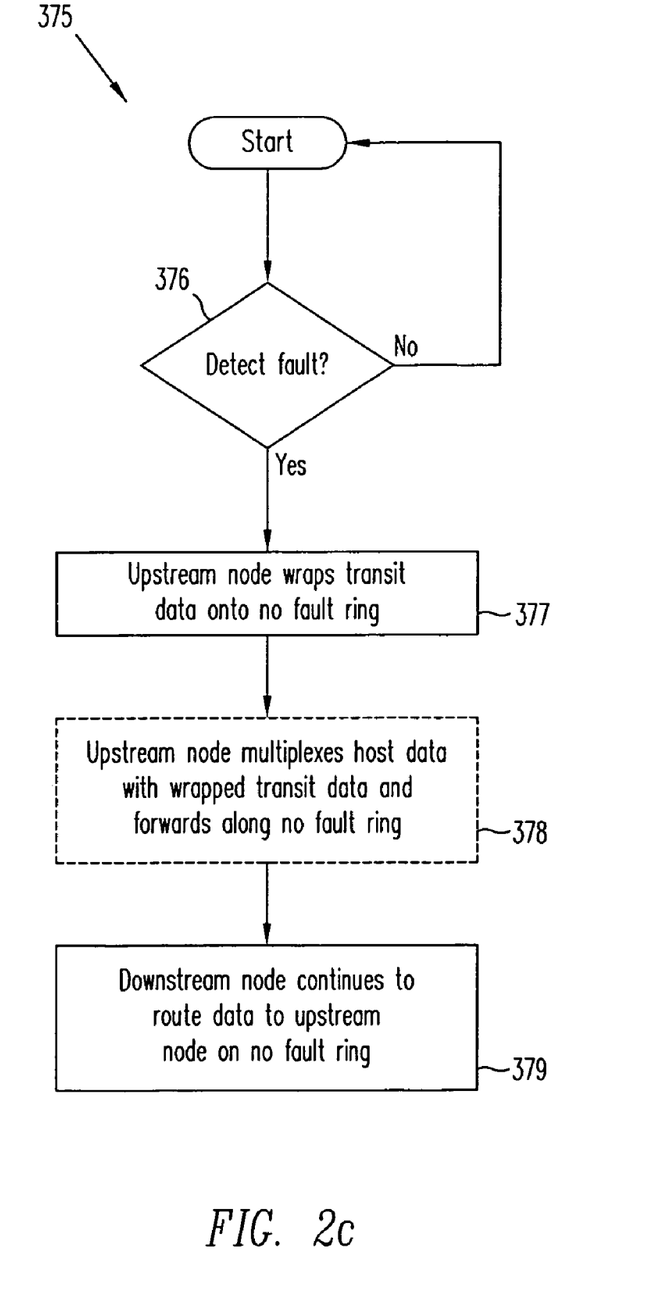
FIG. 2c is a flow chart illustrating a failure wrap mode for a single failure in a small ring.

Referring to FIGS. 2b and 2c, a process 375 is shown for processing single faults in a network (e.g., network 101), where the network includes a small ring. The process 375 is implemented in each node of the network. The process 375 begins by detecting a fault in a transmission media (e.g., transmission media 141) coupled to two nodes (e.g., nodes B 132 and C 133) (376). Once a fault 191 is detected (376, yes), the upstream node (i.e., the node upstream from the fault) (node B 132) wraps transit data (using path 196) onto the intact ring (inner ring 126) (377). In one implementation, the upstream node (node B 132) muliplexes host data (received at input 183, FIG. 3) with the wrapped transit data and forwards the multiplexed data along the intact ring (inner ring 126) (378). The downstream node (node C 133) continues to route transit data to the upstream node (node B 132) on the intact ring (inner ring 126) (379).

In a small ring scenario, upon registering the fault 191 such as a signal fail (loss of frame, loss of signal, line bit error rate, line alarm indication signal (AIS) or excessive CRC errors), signal degrade, wait-to-restore, or a manual request such as a forced switch or manual switch in transmission media 141, data from node A 131 received by node B 132 via transmission media 140 may be wrapped (using path 196) back to node A 131 on transmission media 120, thus avoiding transmission media 141 which has a fault. Data from node D 134 destined for node A 131 and received at intermediary node C 133 on transmission media 122, however, may not be wrapped as in prior art systems, but may be passed through to node B 132 along path 198 and transmission media 121 and to node A 131 along path 199 and transmission media 120.

Note that a single fiber fault in the inner ring 126 causes a similar wrap. When there is a single fault in the inner ring 126 affecting transmission media 121 and no fault in the outer ring 146, data routed through node C 133 on the inner ring 126 is wrapped in node C 133 and forwarded along outer ring 146. In this configuration, since the outer ring 146 does not have a fault, data can flow around the entire intact outer ring.

FIG. 3 shows node B 132 of FIG. 2b in more detail. Data is received in node B 132 along transmission media 140 of outer ring 146 (FIG. 2b). Data may be received in packet format, where each packet has a header, indicating source and destination information. Data packets may be routed through physical layer 250, into line card 200 and be received by lookup block 210 along path 260. Lookup block 210 may consist of a lookup table. Lookup block 210 may use the destination information in the packet header to determine if the packet is destined for the host (not shown) (local traffic) or destined for the outer ring 146 (transit traffic). Local traffic may be forwarded to the host via output 273.

The lookup block 210 may also perform a forwarding function, forwarding transit traffic to a local buffer-SRAM (Static Random Access Memory) 220, and a stripping function, stripping information from particular sources based on the source information in the header. The stripping function may prevent the host from receiving packets from undesirable sources. Transit traffic may be routed to, and stored in, SRAM 220. SRAM 220 may contain two transit queues (not shown)—a high priority transit queue and a low priority transit queue.

A Spatial Reuse Protocol Forwarding (SRPF) block 230 may arbitrate between the transit traffic stored in SRAM 220 and the host data (from high and low priority host queues not shown) received at input 173, multiplexing the transit traffic and host data optionally using SRP fairness logic, such as the fairness logic described in "The Cisco SRP MAC Layer Protocol", Tsiang and Suwala, RFC 2892 (August 2000). The SRP fairness logic is a transmission control logic, which ensures that nodes get equal usage. The SRP fairness logic may determine if a node is sourcing or forwarding an excessive amount of traffic and either impose rate controls or originate and propagate fairness information, requesting that upstream nodes adjust their transmission rates. The logic can also be used to prioritize packets and expedite the handling of priority packets. Each node 130–135 of FIG. 2a may use SRP fairness logic to monitor the number of packets sourced and forwarded by the inner and outer rings 126 and 146. When a node is sourcing or forwarding an excessive amount of traffic, the node may communicate this usage information to upstream nodes via the opposite ring. The upstream nodes may then adjust their transmission rates. As will be discussed in more detail below, different SRP fairness logic may be employed in small and large rings.

Traffic data (usage packets) can be communicated to the SRP logic running in SRPF 235 through the use of a microsequencer 231 placed in outer ring 146 between the SRPF 230 and the multiplexer 240. The microsequencer 231 may be connected to the SRPF 235 on the inner ring 126, thus communicating traffic data to the opposing ring. Since control information flows in the opposite direction as data it measures, the traffic data communicated to the SRPF 235 will reflect the traffic on the inner ring 126. This data can be used by SRPF 235 to regulate traffic on the inner ring 126. Similarly, traffic data can be communicated to the SRP logic running in SRPF 230 through the use of a microsequencer 236 placed in inner ring 126 between the SRPF 235 and the multiplexer 245.

Once data has been routed out of SRPF 230, the data passes through multiplexer 240 and out path 261. The data is routed through the physical layer 255 and back to outer ring 146 (FIG. 2b) via transmission media 141.

Similarly, data is received in node B 132 along transmission media 121 of inner ring 126 (FIG. 2b). Data packets may be routed through physical layer 255, into line card 200 and into lookup block 215 along path 262. Local traffic may be forwarded to the host via output 283. Transit traffic may be forwarded to and stored in SRAM 225. SRPF block 235 may arbitrate between the transit traffic stored in SRAM 225 and the host data received at input 183, multiplexing the transit traffic and host data using SRP fairness logic. Once data has been routed out of SRPF 235, the data passes through multiplexer 245 and out path 263. The data is then routed through the physical layer 250 and back to inner ring 126 (FIG. 2b) via transmission media 120 (FIG. 2b).

Figure 5:
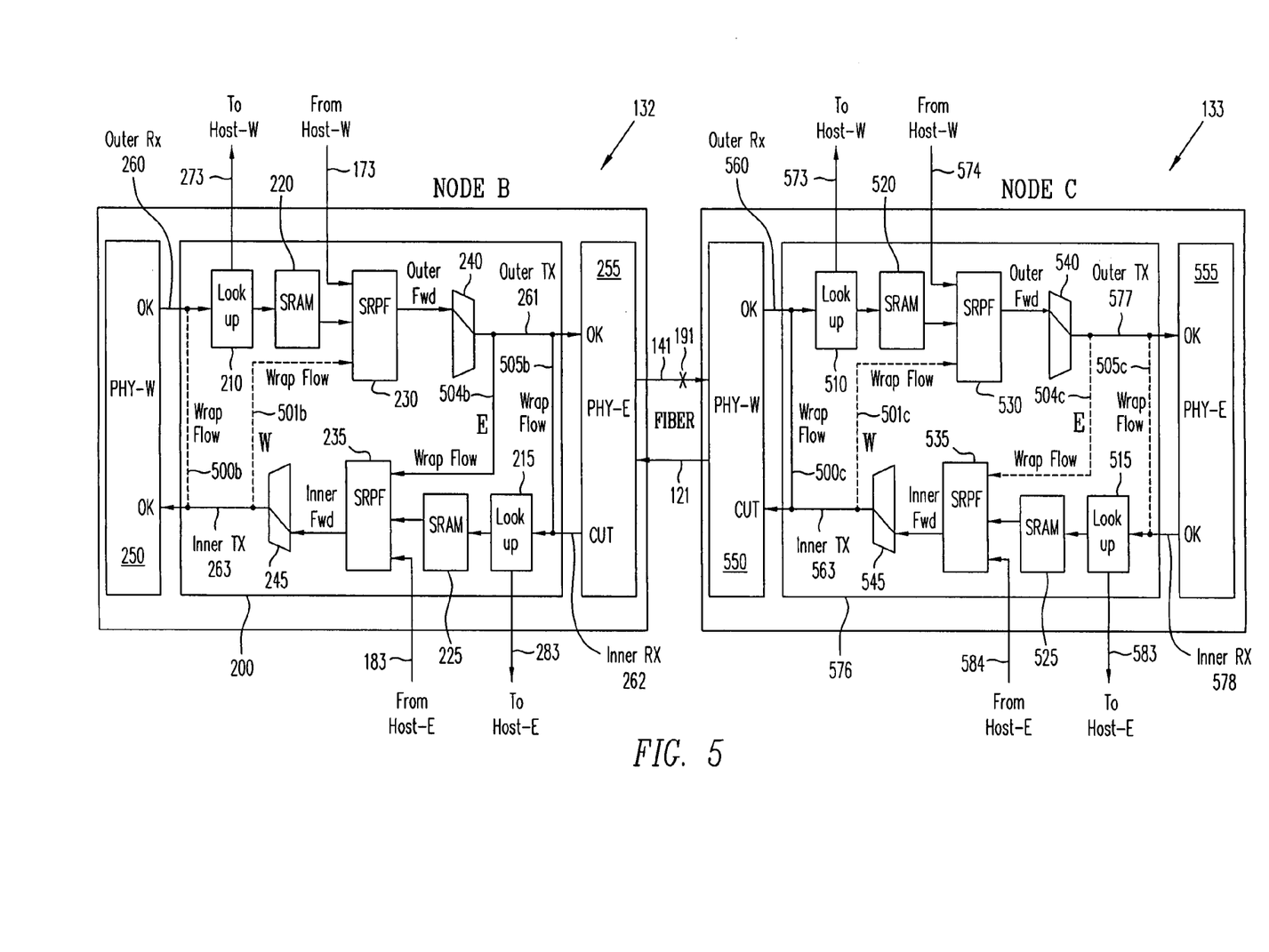
FIG. 5 is a diagram illustrating nodes B and C of FIG. 2a and the flow of data during a single-fault mode, where the enabled wrap paths of FIG. 5 may be used for small rings.
Figure 6:
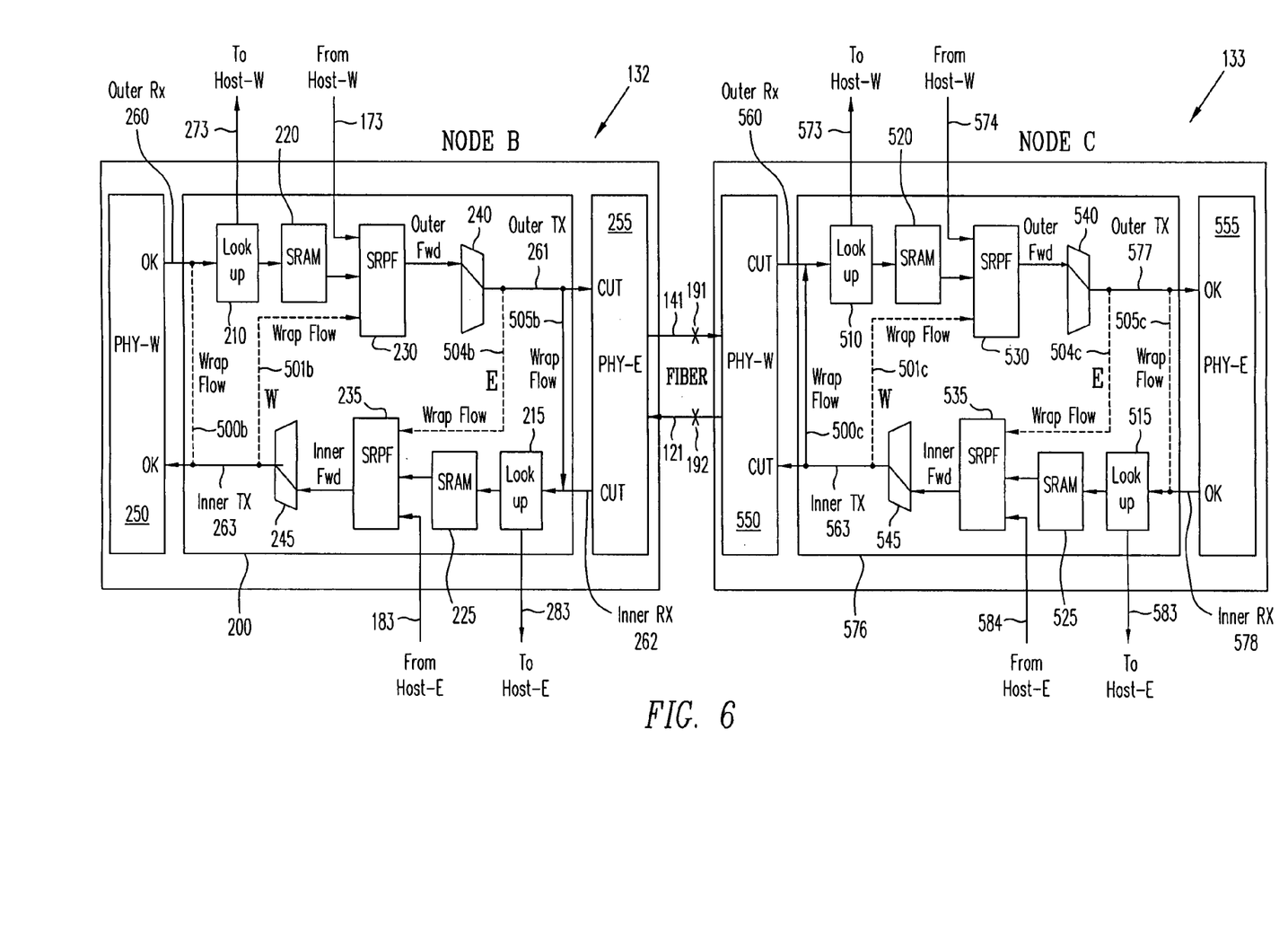
FIG. 6 is a diagram illustrating nodes B and C of FIG. 2a and the flow of data during a dual-fault mode or a single-fault mode in a large ring.

Data wrap paths 500b, 501b, 504b and 505b may be used when a fault occurs on either inner ring 126 or outer ring 146 between a given node and an adjoining node as described in more detail below. Line card 200 also includes an intelligent controller (not shown) for interpreting IPS information and routing data through paths 500b, 501b, 504b and/or 505b according to detected faults and to enable all hosts to be able to continue to send data to inner and outer rings 126 and 146 regardless of the failure mode without dropping data. Data wrap paths 500b–c, 501b–c, 504b–c and 505b–c in FIGS. 3 and 5–6 are active when marked with solid lines and are inactive when marked with dashed lines. Different path combinations may be used for different fault scenarios.

Referring to FIGS. 5–6, node C 133 operates substantially similar to node B. Data is received in node C 133 along transmission media 141 of outer ring 146 (FIG. 2b). Data packets may be routed through physical layer 550, into line card 576 and into lookup block 510 along path 560. Local traffic may be forwarded to the host via output 573. Transit traffic may be forwarded to and stored in SRAM 520. SRPF block 530 may arbitrate between the transit traffic stored in SRAM 520 and the host data received at input 574, multiplexing the transit traffic and host data using SRP fairness logic. Once data has been routed out of SRPF 530, the data is routed to multiplexer 540 and out path 577. The data is routed through the physical layer 555 and back to outer ring 146 (FIG. 2b) via transmission media 142 (FIG. 2b).

Similarly, data is received in node C 133 along transmission media 122 (FIG. 2b) of inner ring 126 (FIG. 2b). Data packets may be routed through physical layer 555, into line card 576 and into lookup block 515 along path 578. Local traffic may be forwarded to the host via output 583. Transit traffic may be forwarded to and stored in SRAM 525. SRPF block 535 may arbitrate between the transit traffic stored in SRAM 525 and the host traffic received at input 584, multiplexing the transit traffic and host data using SRP fairness logic. Once the data has been routed out by SRPF 535, the data may be routed to multiplexer 545 and out path 563. The data is routed through the physical layer 550 and back to inner ring 126 (FIG. 2b) via transmission media 121 (FIG. 2b).

Figure 4:
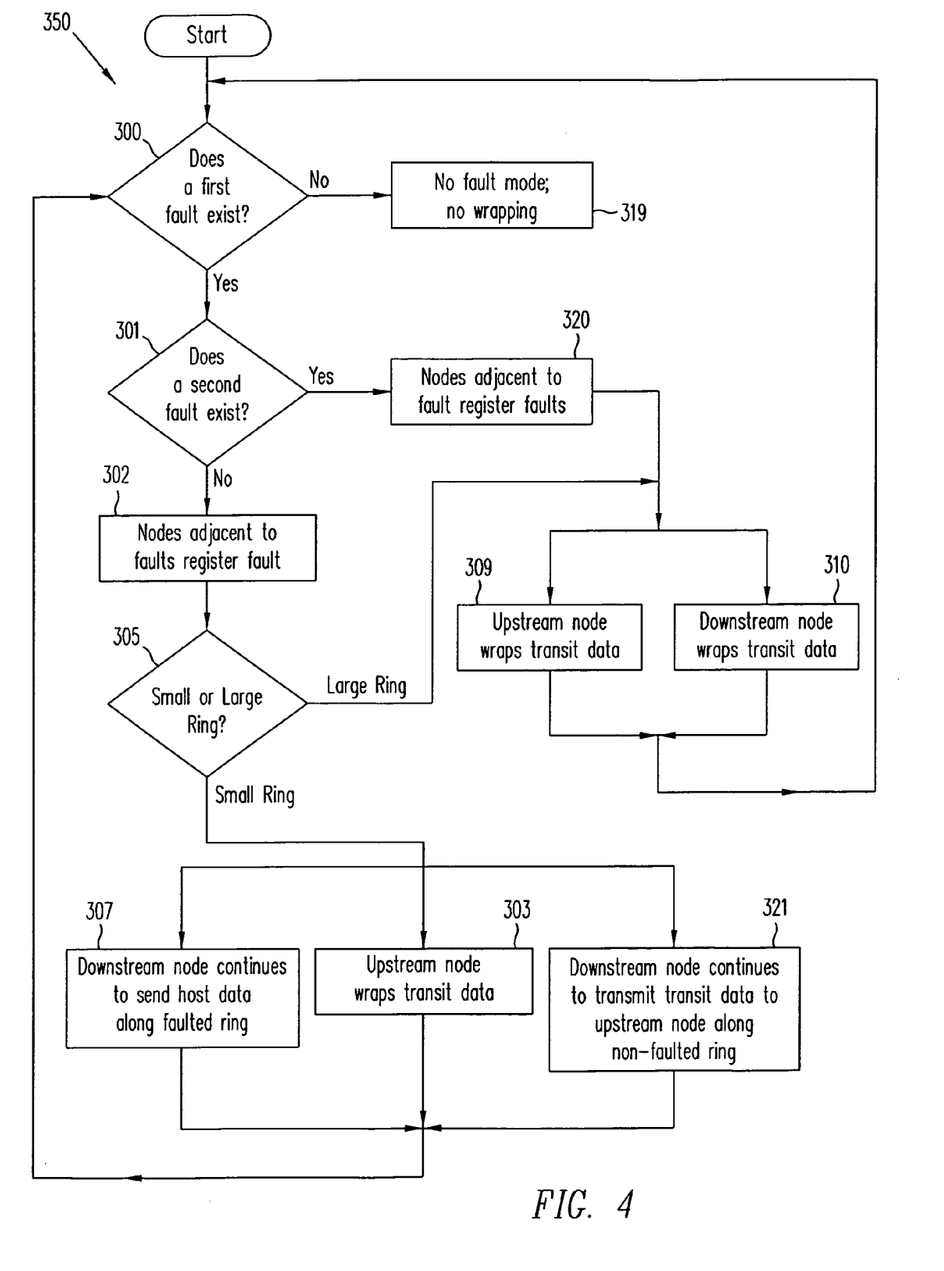
FIG. 4 is a flow chart illustrating four failure wrap modes.

FIG. 4 illustrates an alternative process for processing multiple fault scenarios in a network 101. The process 350 is implemented in each node of network 101. Process 350 provides failure scenarios for (i) a no fault mode; (ii) a single-fault mode in a small ring, (iii) a single-fault mode in a large ring, or (iv) a dual-fault mode, where scenario (ii) was illustrated in higher level detail in FIG. 2c.

In a no-fault mode (i), nodes B 132 and C 133 do not detect a first fault (300, No). In the no-fault mode, data is not wrapped in either nodes B 132 or C 133 (319).

Referring to FIGS. 4 and 5, if a first fault occurs in a small ring (failure scenario ii) (for example fault 191 in transmission media 141) (300, yes), and a second fault does not exist (301, No), nodes B 132 and C 133 register the fault (302). Node C 133 may then broadcast the fault to the rest of the network. Node C 133 may detect the fault with the use of a counter located on path 560 or through detection of an idle frame signal. The counter may decrement whenever data is not being received such that a counter reading of 0 indicates a fault on transmission media 141, (i.e., indicates that data has not been received in a time period large enough to indicate a fault on transmission media 141). Node B 132 may first detect the fault when interpreting IPS data.

If the ring is a small ring (305, Small Ring), transit traffic in node B 132 flowing out of multiplexer 240 may be wrapped via wrap flow path 504b into SRPF 235 (303). SRPF 235 processes the wrapped data and any host data received from input 183 according to the SRP fairness logic described above. (Alternatively, transit traffic in node B 132 flowing out of multiplexer 240 may be wrapped via wrap flow path 505b into lookup block 215.) Concurrently, node C 133 continues to transmit data from node D (134, FIG. 2b) to node B 132 via transmission media 121 (321). Host data received at input 574 in a small ring (305, Small Ring) may continue to be routed on outer ring 146 (FIG. 2b) as shown in FIG. 4 (307).

In this configuration in node B 132, high priority outer and inner transit queues (i.e., SRAMS 220 and 225 servicing the outer ring 146 and inner ring 126) may be served in a round robin fashion at SRPF 235. However, low priority traffic from the non-faulted ring may be given priority over the same low priority traffic from the ring with a fault. Congestion control becomes more complicated when the ring size increases because flow control information (normally routed in the direction opposite to the respective data) takes too long to reach an upstream node, in which case low priority traffic may be starved by the non-wrapped traffic. Hence, the configuration of FIG. 5 may be more suitable for smaller rings.

Referring to FIGS. 4 and 6 (and disregarding fault 192 for the moment), if a single fault is detected on a large ring (failure scenario iii), transit data in both the upstream and downstream nodes B 132 and C 133 is wrapped (e.g., using paths 505b and 500c) (309, 310).

Alternatively, the transit data may be wrapped using paths 504b and 501c (or 504b and 500c or 505b and 501c). Using paths 505b and 500c, and thus routing the transit traffic through SRAMs 225/520 has the advantage of increasing the storage capacity of the node. Using paths 504b and 501c decreases propagation delays. Regardless of which combination of paths is used, routing data into the path at a position before the host data is received along the ring ensures that the incoming host data is not dropped.

In an alternative implementation, a large ring can be treated similarly to a small ring with the exception of the treatment of host data. Transit traffic in node B 132 flowing out of multiplexer 240 may be wrapped via wrap flow path 504b into SRPF 235. SRPF 235 processes the wrapped data according to the SRP fairness logic described above.

Concurrently, node C 133 may continue to transmit data from node D (134, FIG. 2*b*) to node B 132 via transmission media 121 (321). As opposed to sending host data received on the outer ring at input 574 along the outer ring 146, the host data received at input 574 may be wrapped to the inner ring 126 (FIG. 2*b*) using a wrap path (not shown) between SRPF 530 and Multiplexer 545.

In a dual-fault mode (failure scenario iv), shown in FIG. 6, faults are detected between two adjacent nodes on both the inner and outer rings 126 and 146 (301, yes). Node B 132 detects fault 192 and node C 133 detects fault 191 and both nodes inform the other node of the faults through the non-faulted media (i.e., node C 133 informs node B 132 through outer ring 146 of FIG. 2*b*). Once two faults are detected, transit data in both the upstream and downstream nodes B 132 and C 133 is wrapped (e.g., using any combination of paths 504*b* or 505*b* and 500*c* or 501*c* as described above with regard to the large ring scenario) (309, 310). Host data received at inputs 183 and 574 is multiplexed with the wrapped data and sent out along the respective rings, thus preserving the host data.

Once both faults 191 and 192 clear (300, no), then the respective line cards (e.g., line cards 200 and 576) resume operating in a no-fault mode (319).

Although the description above focuses on faults in transmission media 141 and 121, similar techniques may be employed for any fault regardless of the location. The exact location of the wrap paths may be varied without departing from the spirit of the invention. The network may include any number of nodes and may include elements between the nodes.

A number of implementations of the invention have been described. Nevertheless, it will be understood that various modifications may be made without departing from the spirit and scope of the invention. For example, the location of wrap paths 500*b–c*, 501*b–c*, 504*b–c* and 505*b–c* may be modified without departing from scope of the invention. One or more numbered elements may be implemented with the same element. Accordingly, other implementations are within the scope of the following claims.

What is claimed is:

1. A network including one or more nodes connected by first and second rings formed by two or more transmission media, each transmission media including one or more signal channels, the network comprising:

a first node;

a second node connected to the first node by a first transmission media adapted to transmit transit data from the first node to the second node and a second transmission media adapted to transmit transit data from the second node to the first node;

a third node connected to the second node by a third transmission media adapted to transmit transit data from the second node to the third node and a fourth transmission media adapted to transmit transit data from the third node to the second node;

a fourth node connected to the first node by a fifth transmission media adapted to transmit transit data from the fourth node to the first node and a sixth transmission media adapted to transmit transit data from the first node to the fourth node;

the second node operable to receive transit data from the fourth transmission media; detect a first fault in the second transmission media, and forward the transit data from the third node received on the fourth transmission media to the third node on the third transmission media;

the first node operable to receive transit data on the fifth transmission media; and, irrespective of the existence of the first fault, forward the transit data from the fourth node to the second node on the fifth and first transmission media; wherein the first ring includes the first transmission media, the third transmission media, and the fifth transmission media; and wherein the second ring includes the second transmission media, the fourth transmission media, and the sixth transmission media; and wherein the second node is operable to multiplex first host data received into the second node on the second ring with the transit data received on the second ring from the third node creating first multiplexed data; forward the first multiplexed data to the first ring; receive second host data onto the first ring; multiplex the second host data with the first multiplexed data creating second multiplexed data; and forward the second multiplexed data to the third node on the third transmission media.

2. A network including one or more nodes connected by first and second rings formed by two or more transmission media, each transmission media including one or more signal channels, the network comprising:

a first node;

a second node connected to the first node by a first transmission media adapted to transmit transit data from the first node to the second node and a second transmission media adapted to transmit transit data from the second node to the first node;

a third node connected to the second node by a third transmission media adapted to transmit transit data from the second node to the third node and a fourth transmission media adapted to transmit transit data from the third node to the second node;

a fourth node connected to the first node by a fifth transmission media adapted to transmit transit data from the fourth node to the first node and a sixth transmission media adapted to transmit transit data from the first node to the fourth node;

the second node operable to receive transit data from the fourth transmission media; detect a first fault in the second transmission media, and forward the transit data from the third node received on the fourth transmission media to the third node on the third transmission media;

the first node operable to receive transit data on the fifth transmission media; and, irrespective of the existence of the first fault, forward the transit data from the fourth node to the second node on the fifth and first transmission media; wherein the first ring includes the first transmission media, the third transmission media, and the fifth transmission media; and wherein the second ring includes the second transmission media, the fourth transmission media, and the sixth transmission media; and wherein the first node is operable to receive host data; upon not detecting the first fault, multiplex the host data with the transit data received on the fifth transmission media and forward the multiplexed data to the second node on the first transmission media; and upon detecting the first fault, forward the host data to the fourth node on the sixth transmission media.

3. The network of claim 1, wherein the first node is operable to receive host data and, irrespective of the existence of the first fault, multiplex the host data with the transit data received on the fifth transmission media and forward the multiplexed data to the second node on the first transmission media.

4. The network of claim 1, wherein the first through sixth transmission media are fiber.

5. The network of claim 1, wherein:
the first node is operable to detect a second fault in the first transmission media; and forward the transit data from the fourth node received on the fifth transmission media to the fourth node on the sixth transmission media.

6. The network of claim 5, wherein:
the second node is operable to multiplex first host data received into the second node on the second ring with the transit data received on the second ring from the third node creating first multiplexed data; forward the first multiplexed data to the first ring; receive second host data onto the first ring; multiplex the second host data with the first multiplexed data creating second multiplexed data; and forward the second multiplexed data to the third node on the third transmission media; and the first node is operable to multiplex third host data received into the first node on the first ring with the transit data received on the first ring from the fourth node creating third multiplexed data; forward the third multiplexed data to the second ring; receive fourth host data onto the second ring; multiplex the fourth host data with the third multiplexed data creating fourth multiplexed data; and forward the fourth multiplexed data to the fourth node on the sixth transmission media.

7. The network of claim 1, wherein one or more nodes includes an add/drop multiplexer operable to extract or add host data.

8. The network of claim 1, wherein the first node detects the first fault by interpreting intelligent protection switching data.

9. The network of claim 8, wherein the first node is operable to broadcast the first fault to one or more nodes.

10. The network of claim 1, wherein the first node includes a counter operable to detect the transit data from the second node.

11. The network of claim 1, wherein the counter is operable to adjust whenever the transit data is not received.

12. The network of claim 1, wherein the first node is operable to detect an idle frame signal.

13. The network of claim 1, wherein at least one of the first ring and the second ring is a small ring.

14. In a system that includes a first and a second ring coupling two or more nodes, a method for transmitting first and second transit and first and second host data through the system wherein the first and second rings have faults between two nodes, the method comprising:
wrapping in a first node first transit data from the second ring to the first ring;
receiving first host data in the first node along the first ring;
multiplexing the first transit data with the first host data, creating first multiplexed data;
routing the first multiplexed data along the first ring;
wrapping in a second node second transit data from the first ring to the second ring;
receiving second host data in the second node along the second ring;
multiplexing the second transit data with the second host data, creating a second multiplexed data;
routing the second multiplexed data along the second ring;
receiving third host data in the first node along the second ring;
multiplexing the third host data with the first transit data prior to wrapping the first transit data;
wrapping the third host data with the first transit data from the second ring to the first ring;
receiving fourth host data in the second node along the first ring;
multiplexing the fourth host data with the second transit data prior to wrapping the second transit data; and
wrapping the fourth host data with the second transit data from the first ring to the second ring.

* * * * *

UNITED STATES PATENT AND TRADEMARK OFFICE
CERTIFICATE OF CORRECTION

PATENT NO.        : 7,142,504 B1                                          Page 1 of 1
APPLICATION NO.   : 09/843021
DATED             : November 28, 2006
INVENTOR(S)       : Necdet Uzun It is certified that error appears in the above-identified patent and that said Letters Patent is hereby corrected as shown below:

At column 12, line 1, please delete "claim 1" and insert --claim 10--

Signed and Sealed this

Twenty-fourth Day of July, 2007

JON W. DUDAS
*Director of the United States Patent and Trademark Office*